(12) United States Patent
Chheda

(10) Patent No.: US 6,266,529 B1
(45) Date of Patent: Jul. 24, 2001

(54) METHOD FOR CDMA HANDOFF IN THE VICINITY OF HIGHLY SECTORIZED CELLS

(75) Inventor: Ashvin Chheda, Dallas, TX (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/078,238

(22) Filed: May 13, 1998

(51) Int. Cl.⁷ .................................................. H04Q 7/20
(52) U.S. Cl. .......................... 455/436; 455/440; 455/67.3
(58) Field of Search .................................. 455/436, 67.3, 455/69, 70, 101–103, 132–137, 272–275, 276.1–278.1, 438–439, 442, 444, 447, 445, 452, 562; 375/220, 260; 370/331

(56) References Cited

U.S. PATENT DOCUMENTS

| | | | |
|---|---|---|---|
| 3,121,228 | * 2/1964 | Kalmus | 343/113 |
| 4,104,512 | * 8/1978 | Strayer | 364/439 |
| 5,161,249 | * 11/1992 | Meche et al. | 455/33.3 |
| 5,170,485 | * 12/1992 | Levine et al. | 455/33.2 |
| 5,625,876 | * 4/1997 | Gilhousen et al. | 455/33.3 |
| 5,848,063 | * 12/1998 | Weaver, Jr. et al. | 370/331 |
| 5,884,174 | * 3/1999 | Nagarajan et al. | 455/436 |
| 5,898,682 | * 4/1999 | Kanai | 370/331 |
| 5,917,811 | * 6/1999 | Waever, Jr. et al. | 370/332 |
| 5,930,242 | * 7/1999 | Mimura | 370/331 |
| 5,946,621 | * 8/1999 | Chheda et al. | 455/440 |
| 5,974,318 | * 10/1999 | Satarasinghe | 455/436 |
| 5,999,816 | * 12/1999 | Tiedemann, Jr. et al. | 455/437 |

* cited by examiner

Primary Examiner—Daniel Hunter
Assistant Examiner—C. Chow
(74) Attorney, Agent, or Firm—John D. Crane; Bracewell & Patterson, L.L.P.

(57) ABSTRACT

A method for improved sector handoff within a sectorized communication cell utilizing a wireless communication systems. A sector handoff of a mobile radio telephone is performed in accordance with a first set of parameters if the mobile radio telephone is not in close proximity to a base antenna. Sector handoff of the mobile radio telephone is performed in accordance with a second different set of parameters when the mobile radio telephone is in close proximity of the base antenna. The second different set of parameters are utilized in close proximity to the base antenna to avoid drops and adverse handoffs in high interference, low signal strength areas and provide improved sector handoff when the mobile radio telephone encounters distorted conditions, such that improved sector handoff can be achieved.

17 Claims, 7 Drawing Sheets

METHOD FOR CDMA HANDOFF IN THE VICINITY OF HIGHLY SECTORIZED CELLS

BACKGROUND OF THE INVENTION

1. Technical Field

The present invention relates in general to an improved wireless communication system and in particular, the present invention relates to an improved CDMA cellular telephone system. Still more particularly, the present invention relates to a method which allows improved sector handoff performance in highly sectorized CDMA cells in the vicinity of a base station antenna.

2. Description of the Related Art

Mobile radio telephones and mobile telephone systems are well known in the prior art. A mobile telephone system generally includes a mobile hand held radio telephone transceiver, and a base station connected to a local telephone switching system by a landline. Typically, a cellular network has an assigned set of landline telephone numbers that allows users of a mobile hand held transceiver to place and receive calls within a limited range of the base station's antenna.

Mobile hand held transceivers which are specifically designed for telephone communication are often called cellular telephones or mobile radio telephones. Cellular telephone systems have developed rapidly since the early 1980s. Persons equipped with small mobile communication devices, such as mobile radio telephone, can utilize a cellular radio system to communicate in the same way as a hard wired household telephone which utilizes landline carriers.

Due to the increase in cellular telephone utilization, digital communication is gaining popularity over analog communication. Digital communication topologies can simultaneously support many more users than analog topologies in a given frequency spectrum. Since a limited number of frequencies and channels are available, analog systems can only support a very limited number of simultaneous users. A digital radio system can handle more than 20 times the capacity of a traditional analog radio system in the same frequency spectrum. Digital systems employ methods where multiple users share the same frequency. This concept is commonly referred to as "spread spectrum communication." Distinct digital channel sharing topologies have emerged, such as code division multiple access (CDMA), global system for mobile communication (GSM) and time division multiple access (TDMA). A digital system has a considerably larger data transmission capacity than an analog system and higher capacity translates to higher revenues for cellular system owners.

Typically, a mobile radio telephone system assigns a fixed base transceiver to geographic areas. In a typical cellular system, a geographical area is divided into small areas, called cells. Coverage is typically measured as a radius from the base station antenna. Each cell has a predefined coverage radius, for example, large cells commonly referred to as "mega cells" can have a coverage of over 20 kilometers (13 miles). Additionally, macro cells have a coverage from 1 to 20 kilometers, micro cells have a coverage of approximately 1 kilometer, while pico cells have a coverage of only 100 meters. Each cell has its own radio transceiver commonly referred to as a base station. If necessary, each cell can be further subdivided into smaller cells through cell splitting and/or sectorization by steering antenna patterns.

In a typical CDMA system, a honeycomb type pattern of cells is created which utilizes the same range of radio frequencies. In many respects, CDMA is superior to TDMA and Frequency Division Multiple Access (FDMA) because CDMA systems can utilize precisely the same frequency spectrum in all sectors without significant interference among sectors. In CDMA the same set of frequencies can also be utilized from cell site to cell site. A CDMA topology assigns a different binary sequence or code to a transmitted signal to identify the message for an individual mobile transceiver. This allows a single frequency to serve multiple users.

The specifications for CDMA operation are outline in the Electronic Industries Association/Telecommunications Industry Association (TIA/EIA) IS-95-A & TSB74 standards document entitled Mobile Station-Base Station Compatibility Standard for Dual-Mode Wideband Spread Spectrum Cellular System or *CDMA Principles of Spread Spectrum Communication,* by Andrew J. Viterbi.

The correlator, a subcircuit within the mobile transceiver, accepts only energy from identified binary sequences or codes and de-spreads across the spectrum. The mobile receiver correlates its input with the desired carrier and receives the appropriate data. Received signals having codes which do not match the receiver codes are not de-spread in bandwidth and contribute only to noise. The signal to noise ratio of the desired signal is enhanced at the detector of the mobile transceiver by a factor known as the processing gain. One advantage to a CDMA system is that the receiver is not sensitive to worst case interference, but to the average interference.

CDMA has often been dismissed as unworkable in the mobile radio environment because of signal strength differential, as some users are located near the base station and others are located far away. To accommodate the far away users, a spreading bandwidth must be thousands of times greater than the data rate, making the spectral efficiency intolerable. If a reasonable bandwidth is chosen the signal cannot be received from distant users because the users near the base station significantly interfere. To overcome this inefficiency, the transmitter of each mobile is controlled such that the received powers from all users is roughly equal to achieve an interference averaging concept of power control. A similar process is performed on signals sent to the mobles from the base station(s).

Computerized switching is essential to the operation of cellular radio communication. When a communicating mobile transceiver is switched from one cell to another, a transfer of channels must take place without interruption, or at most a brief delay. The growth of electronic switching systems and the development of microprocessors have made seamless communication possible within areas covered by cellular providers. The U.S. Federal Communications Commission (FCC) continues to allocate and license additional radio frequencies. Due to increasing popularity of cellular telephones, in recent years the FCC has awarded additional frequency bands to be utilized by cellular telephone technology.

A cellular telephone system typically includes cellular subscriber units, which are portable, and cellular base stations, which are connected to the public telephone company via one or more cellular switching networks. Each cellular subscriber has an assigned cellular telephone number that allows the user to place and receive calls within a widespread range of the cellular base stations, such as throughout a metropolitan area.

Cellular telephone systems are thus based on a structure of associated cells. Cells are specified geographic areas that are defined for a specific mobile communication system where each cell has its own base station(s) and controllers) interconnected with a public telephone network.

Communication between base stations and mobile subscribers is established by negotiation protocols upon call origination. As a user passes from cell to cell, the cellular service allows calls in progress to be handed over without interruption (soft handoff) or minimal interruption (hard handoff) to adjacent cells thus providing seamless communication.

Handoffs of a mobile radio telephone between cells and sectors in CDMA ideally occur as soft handoffs. In a CDMA system, mobile radio telephone stores a list of active channels (utilized for demodulation purposes) which are being received at acceptable levels in an "active set". The active set members are sector and/or cell channels that transmit and receive identical information with the mobile. A soft handoff occurs when the active set contains more than one sector and/or cell. When a communication path becomes weak, the mobile radio telephone will remove the weak channel from the active list, via protocols defined in IS-95, but there is no noticeable disruption in the communication link. Similarly, if a new sector and/or cell increases in strength, the mobile and network will add this new sector and/or cell to the active set of the mobile via IS-95 protocols which are comprised of messages and thresholds, etc.

A hard handoff typically occurs when communication on a particular frequency is dropped and a new channel having a different frequency is acquired. For example, a termination of communication on one frequency and initiation of a new communication link on another frequency is a hard handoff. Hard handoffs typically occur when a mobile moves outside a coverage area and the call is switched from one service provider to another who utilizes a different frequency. In a CDMA system, typically, all cells are owned by a single service provider and operate in the same frequency spectrum. Therefore, soft handoffs are the prevalent method of handoffs. Hard handoffs can occur when adjacent cells are utilizing the same frequency. Typically, hard handoffs are less common than soft handoffs in CDMA and a hard handoffs occur according to the service providers system parameters and network functionality.

A typical six sectored CDMA cell contains a twelve element antenna. Each antenna element can provide a highly directional radiation and reception pattern. As depicted in FIG. 1, a single element radiation and reception pattern projecting from antenna mast 6 is commonly referred to as a sector. A twelve element antenna provides six sectors in a radial configuration placed adjacent to one another separated by imaginary partition lines 5. Six patterns each rotated 60 degrees encircle antenna mast 6 and provide coverage within cell 34. As the radiation patterns are offset by 60 degrees, side lobes 4 also orient in 60 degree offsets. Six of the twelve elements are typically utilized for transmission and reception, while the other six are utilized for reception only, providing dual antenna reception diversity. Therefore, in each sector, one antenna is utilized for transmitting and receiving and the other antenna is utilized for receiving only. Radially configuring main lobe 2 in each 60 degree sector creates significant side lobe interference in the area depicted by side lobe area 9.

High capacity cells can employ 8 or 10 sectors for improved performance. An ideal antenna pattern has a main lobe 2 which provides clear sectorization at a far distance from antenna mast 6, however, near antenna mast 6 there is significant overlap of radiation energy due to minor lobes called side lobes 4 and back lobes 8. Side lobes 4 and back lobes 8 cause interference to other antennae in the array in side lobe area 9. Additionally, each antenna transmitting element also has vertical profiles, hence, vertical side lobes and back lobes. Therefore, within side lobe area 9 there is no single sector providing dominant coverage and all sectors provide weak coverage.

As sectorization within cells increases, the probability of dropping a call near and around antenna mast 6 also increases. This is due to the attributes of the antenna array's reception and radiation pattern in the vicinity of the antenna. An antenna array inherently has undesirable interference as a result of overlapping side lobes of individual antenna elements near antenna mast 6. Each sector receives a significant amount of interference due to leakages, side lobe radiation and back lobe radiation due to the inherent electromagnetic characteristics near the antenna. Side lobes are most prevalent near antenna mast 6 and signal quality can be severely effected in this region. In a CDMA system, all sectors of an antenna may be received by the mobile at approximately the same strength near or under antenna mast 6.

Each sector produces a continuously broadcasted pilot signal so any mobile radio telephone scanning the spectrum for usable pilots can decide which sector will provide the best communication link. When moving towards an antenna mast, the change from one dominant pilot to a number of weak pilots of equal strength can happen very suddenly. This is due to the lack of dominant coverage within side lobe area 9. Less than desirable coverage of all sectors occurs due to side and back lobes overlap. Alternatively, a change from many weak pilots to a, yet unknown dominant pilot can also occur as the mobile radio telephone moves away from antenna mast 6.

Sudden changes in reception due to a change from a single strong pilot to multiple weak pilots can degrade the forward link to such an extent that is not possible for the network to instruct the mobile radio telephone to add the newly acquired weak pilots, hence, the lone communication link may not support the mobile radio telephone. Without newly acquired pilots, eventually the call will drop or the frame error rates will increase, impacting system capacity and performance and the user may be disconnected.

Additionally, as more sectors per cell are implemented, the Pilot Carrier-to-Interference (C/I) ratio of each of the sectors near and around antenna mast 6 are relatively equivalent. Pilot C/I ratios are low around the base of antenna mast 6 and therefore there is no dominant sector to be identified by a mobile radio telephone. Pilot C/I ratios at the base of antenna mast 6 are often lower than the threshold level utilized by a mobile radio telephone to add carriers and initiate a communication link. In other words, the pilots from adjacent sectors may not be acquired by a mobile radio telephone near the base of antenna mast 6 because received signals are below specified threshold levels and a call in progress can drop or degrade drastically without identification of potential alternate paths for diversity reception and demodulation.

Currently, sectored cells function at about 80% forward link loading during peak time. Alternately described, each sector on the average utilizes 80% of its total high power amplifier power to service users. With typical 16% pilot power, the pilot C/I for each sector at or around the antenna mast is approximately −14.8 dB. Therefore, in a six sector cell the mobile radio telephone may be moving in one of the sectors (its pilot C/I about −7 dB when dominant) toward the base station antenna and suddenly, the current sector and all other sectors drop to −14.8 dB. Since, the add pilot threshold is typically −14.0 dB, a handoff transaction can not occur because the additional sectors do not trigger handoff and consequently the additional sectors are not acquired by the mobile radio telephone. A single sector reception having a pilot of −14.8 dB is insufficient to sustain adequate communication and a call may drop or significantly degrade under these circumstances. This impacts call quality and also cell capacity as the single sector must transmit at very high power in attempting to maintain the call with the mobile.

At lower loading, for example 60% loading, the pilot C/I of all the sectors are approximately −13.5 dB, hence a message to add communication links to the mobile radio telephone would be sent by the mobile radio to the base station. However, a sharp decline of signal strength at the base of antenna mast 6 causes protocol problems. For example, the movement of a mobile radio telephone producing a change from a single pilot C/I ratio from −5.7 dB to all pilots at −13.5 dB may also cause a call to drop. As soon as the mobile radio telephone detects that pilots exist which are all above the add pilot threshold, the mobile attempts to send an add signal to the network, via the first original sector. The communication instructing the mobile radio telephone to add other sectors may not be received by the mobile radio telephone because of the significant interference from the other sectors. The add message is re-attempted a number of times (IS-95 protocol) but after a number of attempts the system drops the call. Otherwise, the add sector message may get through on subsequent re-sends, but the frame error rate and transmit power requirements of the base station will increase impacting, capacity, and performance until additional sectors are acquired.

At present, the only solution available is to data-fill the add pilot threshold and drop pilot thresholds to −16.0 and −18.0 dB respectively. However, this extends the cells handoff boundary outwards as the mobile radio telephone moves away from a base antenna to other cells. Changing pilot thresholds redefine cell boundaries and creates cell to cell handoff problems. Lower handoff thresholds compromises resource capacity, such as channel elements and RF capacity as additional sectors in handoff with a mobile radio telephone must transmit to the mobile radio telephone although their signal is never utilized for demodulation purposes.

The disadvantage of lowering thresholds is that excessive handoff may result, which compromises capacity. Additional software development has been attempted to improve handoff performance, however, this is costly. It should therefore be apparent that an improved method for handoff performance utilizing CDMA technology in highly sectorized cells in the vicinity of the base antenna is highly desirable.

SUMMARY OF THE INVENTION

It is therefore one object of the present invention to provide an improved wireless communication system.

It is another object of the present invention to provide an improved CDMA cellular telephone system.

It is yet another object of the present invention to provide improved sector handoff performance in highly sectorized CDMA cells in the vicinity of a base station antenna.

The foregoing objects are achieved as is now described. A method for improved sector handoff within a sectorized communication cell utilizing a wireless communication systems is provided. A sector handoff of a mobile radio telephone is performed in accordance with a first set of parameters if the mobile radio telephone is not in close proximity to a base antenna. Sector handoff of the mobile radio telephone is performed in accordance with a second different set of parameters when the mobile radio telephone is in close proximity of the base antenna. The second different set of parameters are utilized in close proximity to the base antenna to avoid drops and adverse handoffs in high interference, low signal strength areas and provide improved sector handoff when the mobile radio telephone encounters distorted conditions, such that improved sector handoff can be achieved.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 2:
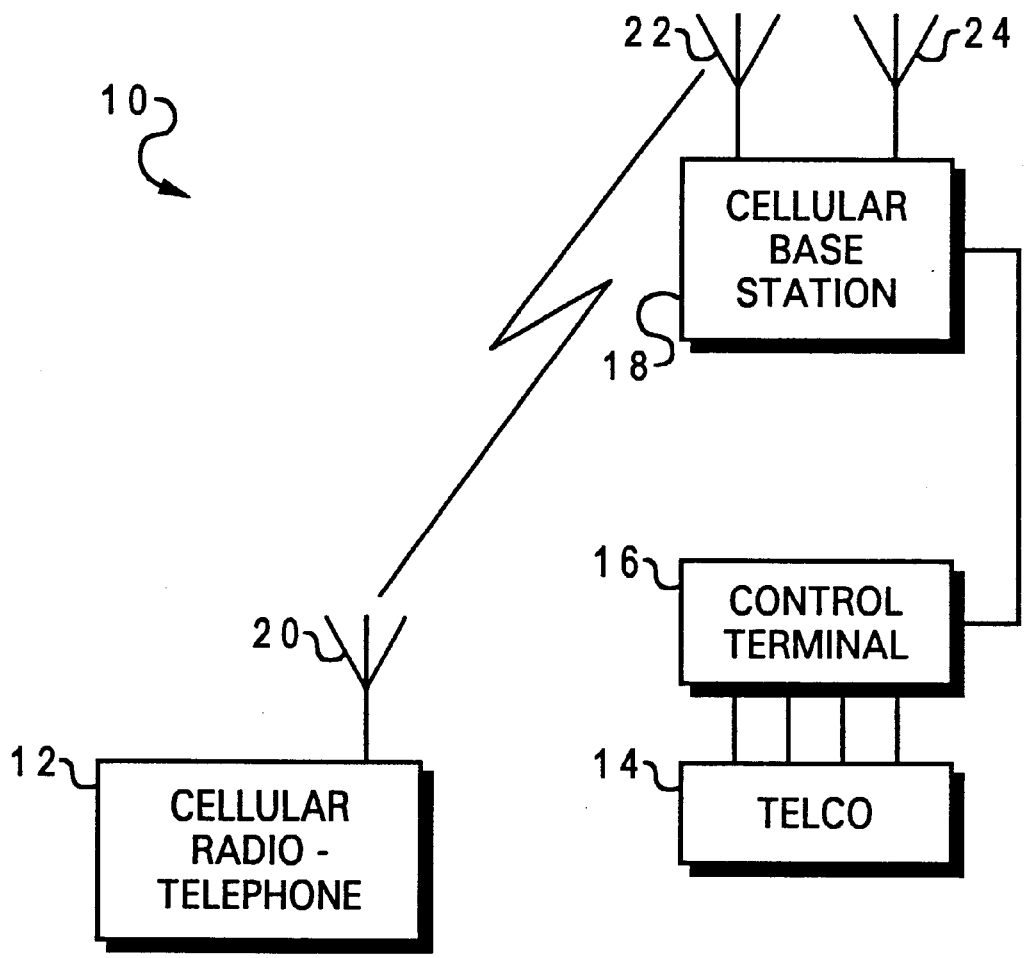
FIG. 2 illustrates a block diagram illustrative of a cellular radio telephone system in accordance with a preferred embodiment of the present invention.

With reference now to the figures and in particular with reference to FIG. 2, there is depicted a block diagram of a cellular telephone system 10 in accordance with the present invention. Cellular telephone system 10 6 includes a telephone company phone system (TELCO) 14, connected by telephone landlines to control terminal 16 which in turn is coupled, also by telephone landlines, to cellular base station 18 that is located near the center of a cell within a mobile cellular telephone system.

Mobile radio telephone 12 communicates with cellular base station 18 via mobile rx/tx antenna 20, base tx/rx antenna 22 and base rx antenna 24. Typically, in a CDMA cellular system base tx/rx antenna 22 and base rx antenna 24 are part of a multi-element antenna atop of a tower or building. A multi-element antenna creates antenna patterns having defined sectors. Implementing two antennae per sector for receive purposes is common to improve system performance. A twelve element antenna can create six sectors having two antenna elements per sector. A high degree of sectorization is desirable to accommodate heavy communication density.

A wide variety of other antennae can also be utilized in conjunction with a wireless communication system such as cellular telephone system 10. Also, landlines utilized in association with cellular telephone system 10 are lines that can be placed in areas on land or inland waterways, and can include twisted pair lines, coaxial cables, and fiber optic cables utilized in overhead, direct buried and underground applications.

Additional cellular base stations may be located throughout a geographic area to provide telephone service to mobile radio telephone 12. Mobile radio telephone 12 may be installed in a vehicle, or a transportable unit which has a battery installed in a carrying case, or mobile radio telephone could be a self contained hand held unit. Mobile radio telephone 12 includes mobile rx/tx antenna 20 to transmit and receive on cellular radio channels. Currently in the United States, the cellular radio channels are in the frequency band from 824–894 MHz. More particularly, in the United States, a total bandwidth of 50 MHz is allocated for cellular mobile service, the 50 MHz is distributed between 824 MHz and 849 MHz, and also between 869 MHz and 894 MHz.

Recently, the FCC has allocated bandwidths in the 1.9 GHz frequency range for cellular communication. All of these frequency allocations can be utilized in accordance with a preferred embodiment of the present invention. Cellular telephone system 10 as described herein is presented for illustrative purposes only and should not be considered as limiting the scope of the present invention.

Figure 3:
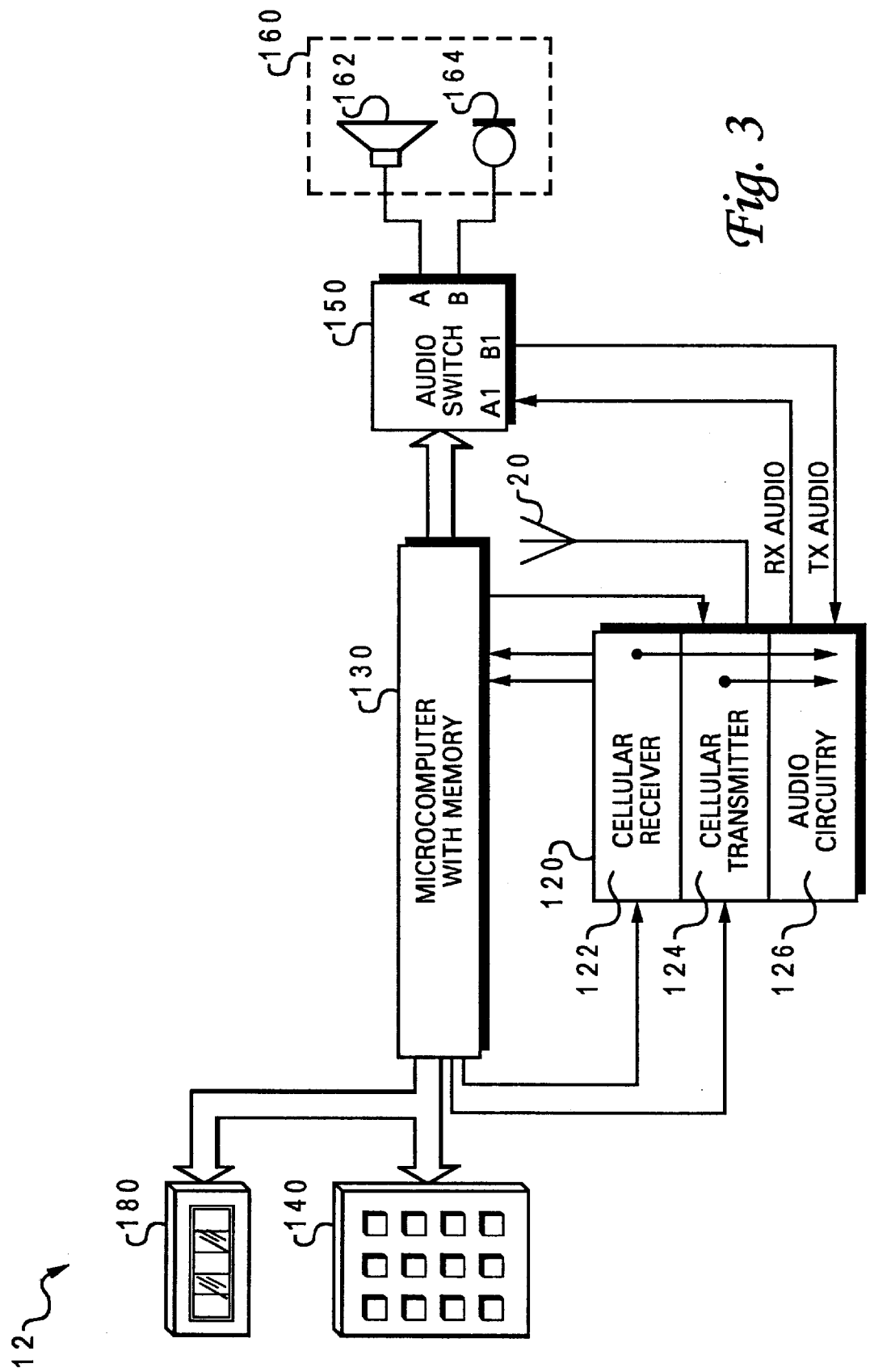
FIG. 3 depicts a block diagram illustrative of a mobile radio telephone which may be utilized in accordance with a preferred embodiment of the present invention.

FIG. 3 is a block diagram of a mobile radio telephone 12 which may be utilized in accordance with the present invention. However, the mobile radio telephone depicted and described should not be construed to limit the scope of the present invention.

A typical mobile radio telephone 12 includes rx/tx antenna 20, cellular telephone transceiver 120, microcomputer 130, keypad 140, display 180, audio switch 150, and audio I/O 160, including speaker 162 and microphone 164. Microcomputer 130 is a computer contained within a single chip microprocessor. Less powerful than mini-computers and mainframe computers, microcomputer 130 is nevertheless capable of complex tasks involving the processing of logical operations, such as controlling radio frequency circuitry. Microcomputer 130 includes a central processing unit (CPU) (i.e., not shown), which is the computational and control unit of microcomputer 130, and which interprets and executes instructions for mobile radio telephone 12. Cellular telephone transceiver is comprised of cellular receiver 122, cellular transmitter 124 and audio circuitry 126.

Figure 4:
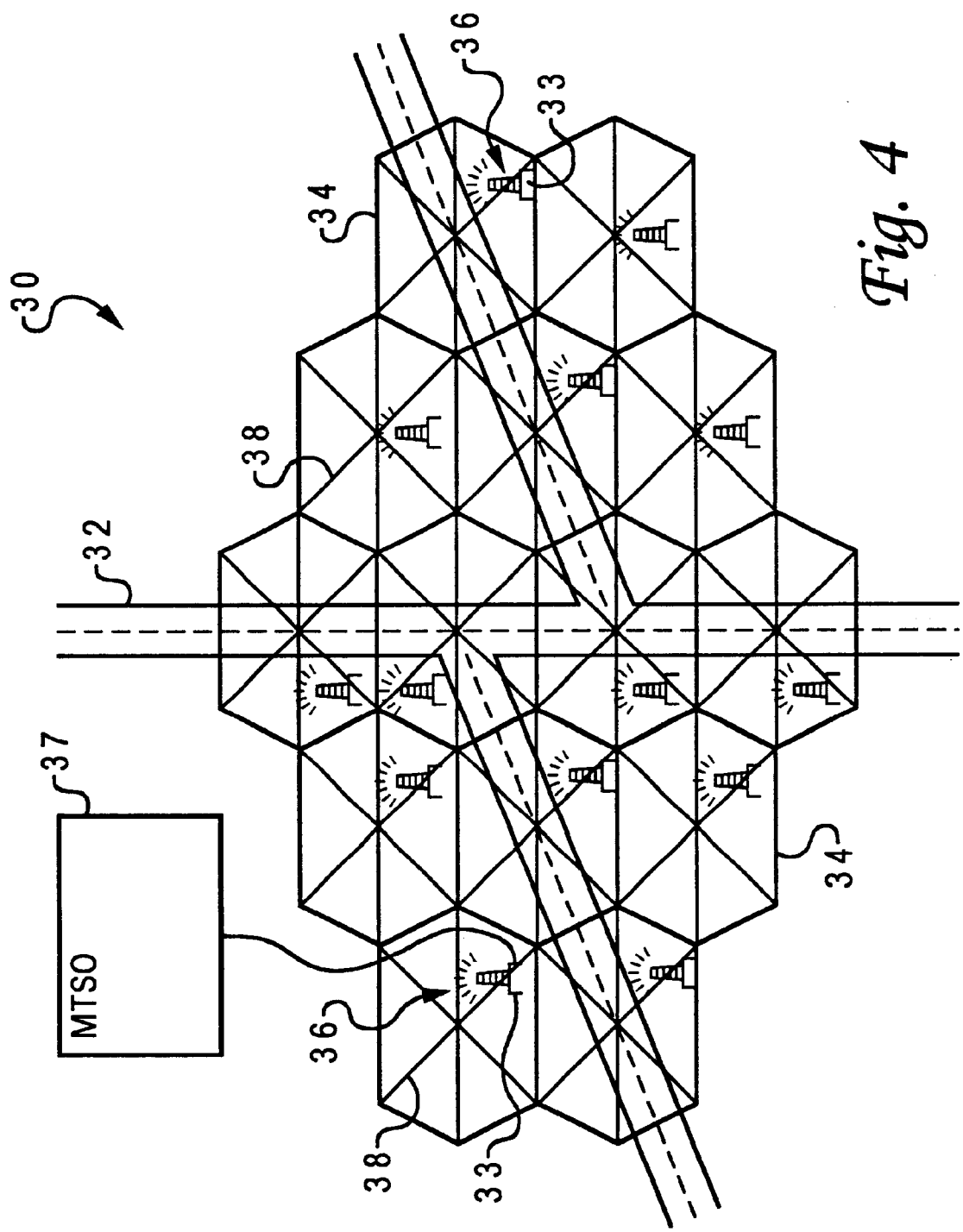
FIG. 4 illustrates a pictorial representation illustrative of a cellular radio telephone system and antenna allocation in which a preferred embodiment of the present invention may be implemented.

FIG. 4 depicts a pictorial representation illustrative of a cellular telephone system 30 in accordance with the present invention. Cellular telephone system 30 is analogous to cellular telephone system 10 depicted in FIG. 2, and may incorporate utilization of communications devices such as mobile radio telephone 12 depicted in FIG. 3. Cellular telephone system 30 is composed of a variety of cells 34. Each cell encompasses a specified geographic area. Each geographic area has its own base station 36 comprised of an antenna and base station controller 33. Base station controller 33 is interconnected with a public telephone network (not shown). Ideally, cells 34 are arranged adjacent to another cell to create a honeycomb pattern of cells. Cells 34 can cover a large metropolitan area. Actual cell coverage is highly irregular and the neat hexagons coverage depicted is idealistic. The actual coverage depends upon the strength of each base station signal, elevation of the base station antenna and any obstructions to the propagation of the signal.

Specific cell radii are not necessary features of the present invention. Cells can have ranges from several hundred feet from the tower up to a radius of approximately 25 miles from the tower. The specific numbers described herein are for demonstrative purposes only and are not necessary features of the present invention. In FIG. 4, each cell 34 is subdivided into sectors. CDMA cells are typically divided into three sectors. However, six sectors coverage provides improved performance over three sector coverage. Illustrated is a CDMA system having six sectors per cell distinguished by sector lines 38. In a CDMA system, the honeycomb pattern of cells 34 can repeatedly utilize the same range of radio frequencies by controlling interference.

A street or road 32, (not to scale) such as a metropolitan highway, is depicted as extending through cells 34 contained within cellular telephone system 30. Thus, a user can travel along road 32 through cells and while travelling, perform cellular mobile telephone operations. Cellular telephone system 30 further includes Base Station Controller (BSC) 33 at each cell. A Mobile Telephone Switching Office (MTSO) 37 is a central office connected to base station controller 33 to control switching in cellular telephone systems.

MTSO 37 is comprised of a fielded monitoring and relay stations (not shown) for switching calls from cell sites to wire line central offices typically present at (TELCO) 14 depicted in FIG. 2. The relay station may be coupled to a public switched telephone network (PSTN), made up of local networks, exchange area networks, and long distance carrier networks that interconnect telephones and other communication devices on a worldwide basis.

MTSO 37 can control system operations in a digital cellular network. For example, MTSO 37 can control calls, track billing information, and locate cellular subscribers. MTSO 37 is a switch that provides services and coordination between mobile radio telephone users in a network, such as cellular telephone system 30, and external networks (not shown).

Figure 5:
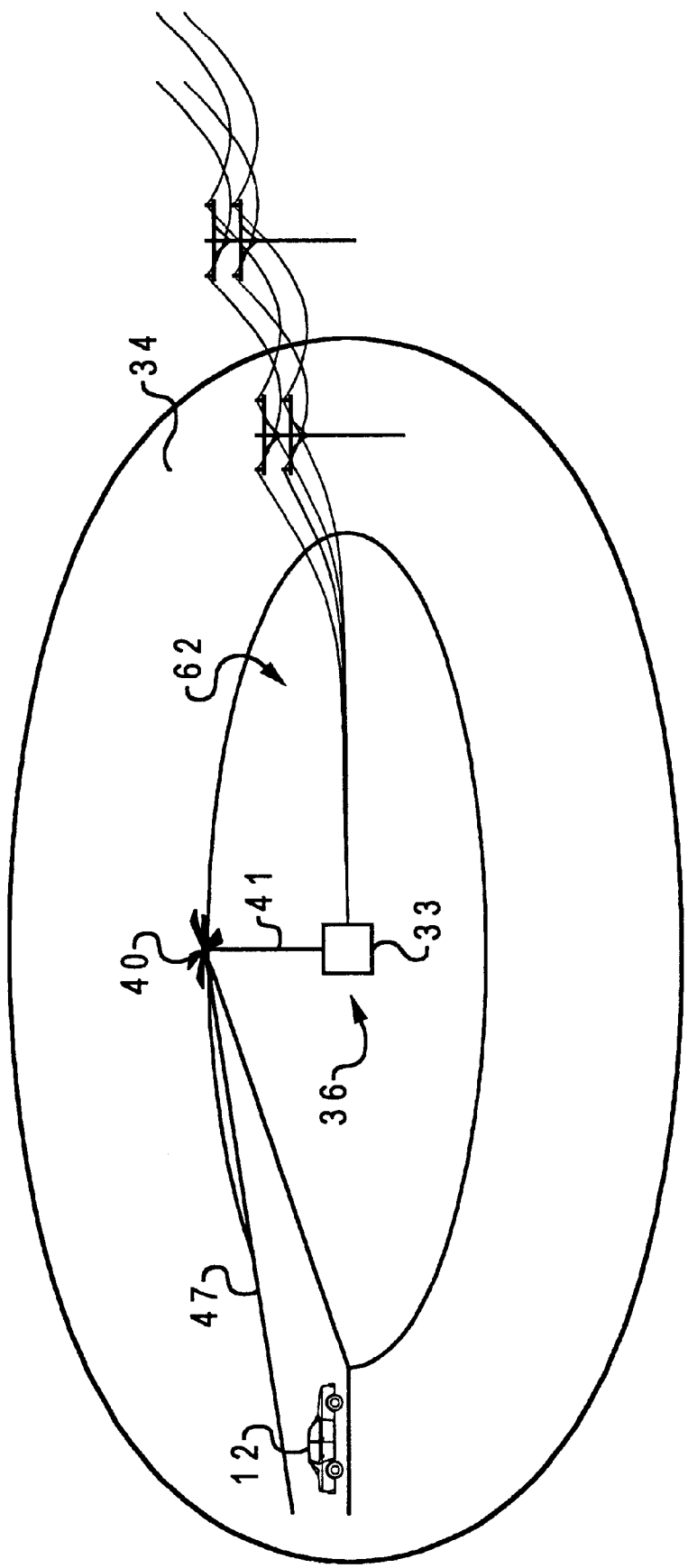
FIG. 5 depicts an antenna radiation pattern in which each sector has equal pilot signal strength in the area close to the base of the antenna.

In FIG. 5, six sector antenna tower 41 within cell 34 typically includes twelve or more directional antennae 40 atop antenna tower 41. Antenna tower 41 is normally centrally located in each cell 34. A twelve element antenna utilizing six antenna elements for radiating can effectively radiate into six sectors offset by sixty degrees. In FIG. 5, sector 47 is highlighted. Area 62 at the base of antenna tower 41 projecting outward to a radius r illustrates how the beam of sector 47 projects to the ground at predetermined distance r from the base of antenna tower 41 and provides dominant coverage in this area to mobile radio telephone 12.

Figure 1:
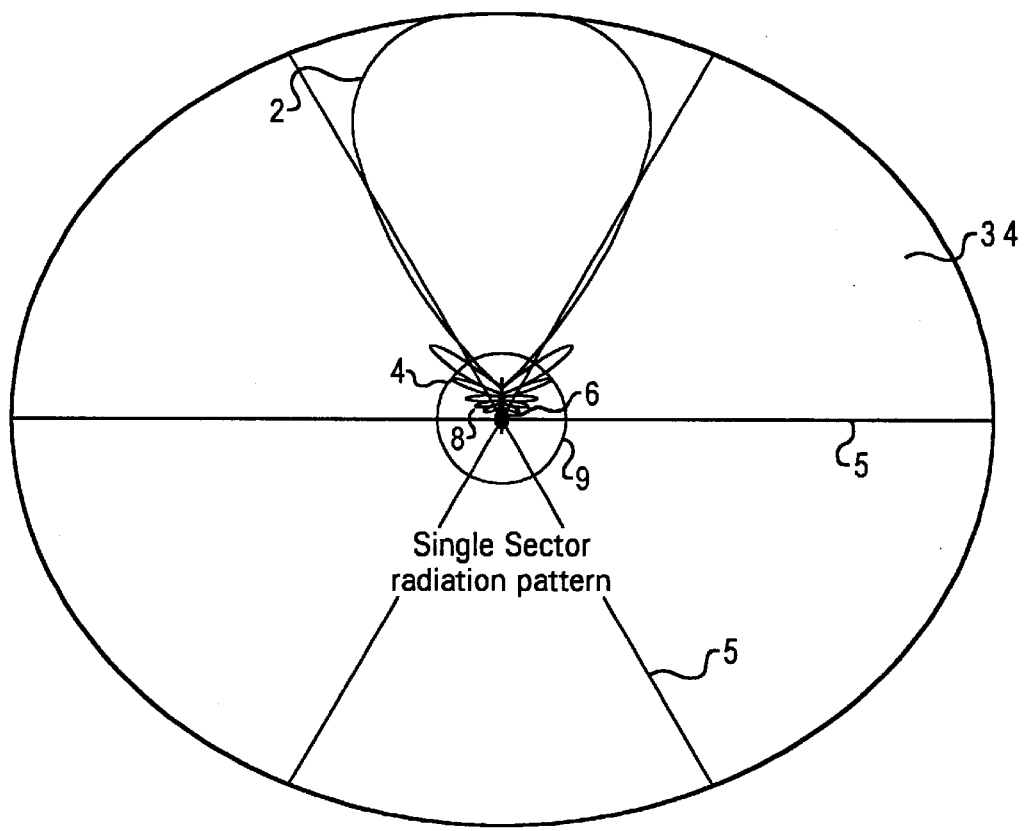
FIG. 1 illustrates a base antenna pattern in accordance with a preferred embodiment.

The region defined by r has side lobes/back lobes of other sectors in the cell which interfere with sector 47 near the base of the antenna. Briefly referring back to FIG. 1, side lobes 4 for a single sector are depicted. Side lobes from six sectors each rotated 60 degrees in relation to one another illustrates the interference encountered in side lobe area 9.

Referring back to FIG. 5, certain areas within area 62 may have six pilot signals with equivalent strength as determined by mobile radio telephone 12. With heavy loading conditions on the base station all six pilot signals can be below acceptable levels and disrupt sector to sector handoff triggering in area 62.

Base station 36 is connected to the public telephone company (i.e. TELCO) via one or more switching networks (not shown). Each cellular subscriber or mobile radio telephone 12 has an assigned cellular telephone number that allows the user to place and receive calls within a widespread range of each base station 36. During a cellular telephone call, a communication link is established. When a mobile radio telephone moves from one cell to another or from sector to sector within a cell, the communication link must be handed off in order to maintain the communication link. In a CDMA system each cell utilizes the same frequency. However, the pilot channels are effectively different because the codes utilized for spreading are un-correlated from pilot channel to pilot channel. The specifications for CDMA operation are outline in the Electronic Industries Association/Telecommunications Industry Association (EIA/TIA) IS-95 standards document entitled U.S. CDMA Cellular Systems.

As a mobile unit utilizing CDMA communication moves within a region of CDMA coverage, the mobile will soft handoff from one sector to another to maintain a continuous communication link. As the mobile demodulates received information and transmits modulated information, it also searches for other useful unique pilot signals transmitted by adjacent sectors. The active set (list of currently demodulated channels) and the candidates set (potential active set members) contained within the mobile radio telephone are constrained in size by the IS-95 standard. A maximum of six sectors are allowed in a mobile radio telephones' active set, thus, only six channels or sectors can be received by a mobile radio telephone in compliance with the IS-95 specification. Therefore, a maximum handoff scenario is a six way soft handoff.

If a mobile radio telephone detects a new pilot whose pilot strength (carrier to total interference ratio) is above an upper threshold (T_ADD), the mobile radio telephone will place the sector associated with the new pilot into its candidate set and send a Pilot Strength Measurement Message (PSMM) to base station controller (BSC) 33 via the current active sector(s). If the active set contains more than one sector, then the mobile is in a soft handoff mode.

In accordance with the present invention, mobile radio telephone 12 sends a PSMM request for entry of candidates into the mobile's active set. Base station controller 33 instructs mobile radio telephone 12 to add the new pilot via an Extended Handoff Direction Message (EHDM) transmitted by all the sectors in the current active set. The mobile radio telephone on receiving the message, adds the candidate to the active set and acknowledges the EHDM and reception from a new sector is acquired. After a soft handoff is accomplished, a Handoff Completion Message (HCM) is transmitted by mobile radio telephone 12 to base station controller 33.

If mobile radio telephone 12 detects that the current sector active pilot signal strength has dropped below a lower threshold (T_DROP) and remains consistently below this threshold level for a predetermined amount of time (T_TDROP), then a PSMM is transmitted to the network by mobile radio telephone 12, requesting that such a sector be dropped from the active set. The HDM and HCM communications follow in order as explained above to complete the soft handoff by dropping sectors having low signal strength.

The T_ADD, T_DROP, T_TDROP and other related soft handoff parameters are typically stored in a database of base station controller 33. Each sector/cell may have a different value for these parameters. Therefore, when mobile radio telephone 12 enters into soft handoff with these parameters, base station controller 33 must decide what value of T_ADD, T_DROP, T_TDROP, etc. to send to mobile radio telephone 12. The decision guidelines utilized for parameters are typically, the minimum of the various T_ADD values in dB, the minimum of the T_TDROP values in dB and the maximum of the T_DROP values in seconds. Therefore, if the sectors involved in handoff with mobile radio telephone 12 have different minimum and maximum threshold values, the decision logic is such that parameters sent to mobile radio telephone 12 via the EHDM will change the defined handoff regions. Typical values for T_ADD, T_DROP and T_DROP are −14.0 dB, −16.0 dB and 4 seconds respectively. The location for storage of the parameters and which subsystem initiate the handoff should not be construed to limit the present invention, various embodiments can be efficiently utilized by the present invention.

Mobile radio telephone 12 can demodulate a number of received signals from sectors in the assigned cell and sectors from adjacent cells to accomplish multipath reception. Multipath reception must be coordinated within mobile radio telephone 12. Multipath coordination is accomplished by RAKE fingers within mobile radio telephone 12. Typically, mobile radio telephone 12 has three RAKE fingers as part of its signal demodulating hardware. Mobile radio telephone 12 will attempt to demodulate the highest quality paths from any of the links, at any given time, by a method referred to as maximal ratio combining.

For additional information regarding CDMA communication refer to the Electronic Industries Association/ Telecommunications Industry Association (TIA/EIA) IS-95-A & TSB74 Standards document entitled Mobile Station-Base Station Compatibility Standard for Dual-Mode Wideband Spread Spectrum Cellular System or *CDMA Principles of Spread Spectrum Communication,* by Andrew J. Viterbi.

Hence, excessive handoffs sacrifice channel capacity as sectors utilize power to transmit to mobile radio telephone 12 even though mobile radio telephone 12 may not be utilizing the transmission because it is receiving other sectors. As the number of fingers in a mobile radio telephone RAKE receiver are increased, sector power utilization is improved.

Optimal handoff between sectors is required to maintain frame error rates and dropped call probabilities below acceptable target levels. Further, satisfactory handoff and diversity of signal paths must be provided to mobile radio telephone 12. Efficient sector handoff is especially beneficial in regions of low speeds and low multipath, as the effects of fading more seriously affect the forward link transmit requirements. Without handoff, and at low speeds, the energy per bit to total noise power spectral density or (Eb/No) requirements for successful forward link demodulation are very high. A high Eb/No requirement mandates higher base station transmit powers and impacts system capacity. Hence, sector handoff provides diversity against fading because each multipath fades independently and the Eb/No requirement for a given grade of service is much lower.

If mobile radio telephone 12 detects strong pilots along its drive route which are above T_ADD, typically, mobile radio telephone 12 will add these strong pilots to its candidate list and notify base station controller 33. It is critical to add candidates to the active set because a RAKE finger could lock onto a stronger multipath reception which would improve performance. Additionally, if sectors with strong pilots are not added to the active set, the sectors produce significant interference and are not utilized for signal demodulation. Therefore, improved future performance by switching to a sector having a stronger pilot can not be accomplished without mobile radio telephone 12 identifying the stronger sector as a candidate.

Additionally, each sector contributes to the multiple access interference to RAKE fingers which are locked onto other sectors. Therefore, by utilizing the principle of maximal ratio combining, the fingers can lock onto various sectors/paths and optimize communication performance.

It is also important to add candidates into the active set because pilots that are comparable in strength often become immediately stronger, and significantly detract from the forward link performance by interfering. Therefore, if these sectors are added into the active set, a finger can quickly lock onto stronger paths as soon as they become the dominant sectors and the user does not receive degraded service.

The pilot carrier to interference ratio (C/I) can be represented by the following equation:

$$PilotC/I_{sector\,i} = \frac{\text{Total Pilot Power } Recvd_{sector\,i}}{N_o W \cdot Nfigure_{mobile} + \sum_{k=1}^{no.\ of\ sectors} Power\ rec_{sector\,k}}$$

Where, sector I is the sector of interest, total pilot power $recvd_{sector\,i}$ is the total pilot power received by the mobile in sector i, $N_o$ is the total noise power spectral density, W is the bandwidth, N $Figure_{mobile}$ is the noise figure of the mobile receiver and $received_{sector\,k}$ is the total power received by mobile radio telephone 12 from sector k.

Figure 6:
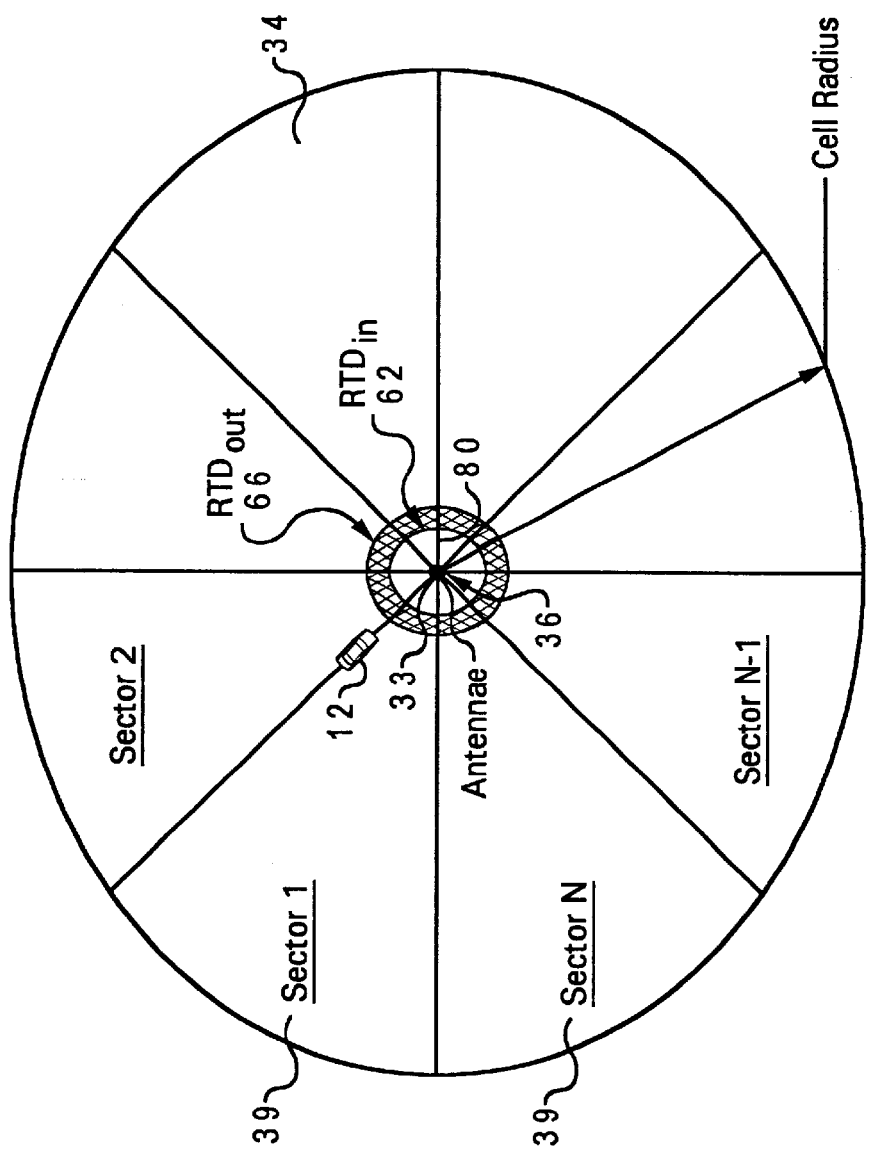
FIG. 6 illustrates an antenna pattern divided into sectors and defines an area close to the antenna where adequate communication is critical.

Referring to FIG. 6, cell 34 is divided into sectors 39 labeled 1 through N. $RTD_{in}$ 62 and $RTD_{out}$ 66 are also illustrated. Proximity of mobile radio telephone 12 to base antenna 80 can be determined utilizing Round Trip Delay (RTD). RTD is twice the propagation delay interval of the radio wave between base antenna 80 and mobile radio telephone 12. Therefore, the mobile radio telephone's distance from base antenna 80 can be estimated by utilizing the product of half the propagation delay and the velocity of radio waves in air.

The RTD is the electrical distance between base antenna 80 and mobile radio telephone 12, not the physical distance. Hence, due to multipath considerations, the physical distance and the electrical distance are not exactly the same. It is preferred that RTD is computed utilizing the earliest arriving multipath. However, many methods are available to determine distance in the present invention and it can be appreciated by those having skill in the art that the method described should not limit the scope of the present invention.

RTD can be calculated by the switching network utilizing synchronization techniques. The base stations are coordinated or synchronized to "true" time utilizing a Global Position System (GPS). Signals are sent from base antenna 80 and received by mobile radio telephone 12 offset by one way delay, (OWD). When received, mobile radio telephone 12 synchronizes the clock of the transmitter to received data. When mobile radio telephone 12 transmits, it is offset or delayed in time by OWD. After receiving a transmission from a mobile radio telephone 12, base station 36 can compute the RTD between mobile radio telephone 12 and base station 36. RTD is utilized by the present invention to modify handoff threshold levels between sectors in the vicinity of base antenna 80.

In accordance with a preferred embodiment of the present invention, two sets of handoff parameters, T_ADD, T_DROP, T_TDROP and others are maintained by base station controller 33. The first set (upper set) of handoff parameters contain higher values of T_ADD, T_DROP etc., and mobile radio telephone 12 utilizes the upper set when mobile radio telephone 12 is not in the vicinity of base antenna 80. The second set (lower set) of handoff parameters contains lower values of T_ADD, T_DROP, etc. Mobile radio telephone 12 is instructed to utilize the lower set via an EHDM message from base station controller 33 when mobile radio telephone 12 is in the vicinity of base antenna 80.

In a preferred embodiment, RTD is determined by the drive test disclosed above. However, alternate methods of proximity to the antenna could be utilized without departing from the scope of the present invention. The RTD value is monitored by base stations in the active set and is stored in base station controller 33. When RTD exceeds the determined value, a different set of parameters are utilized for the soft handoff procedure.

Figure 7:
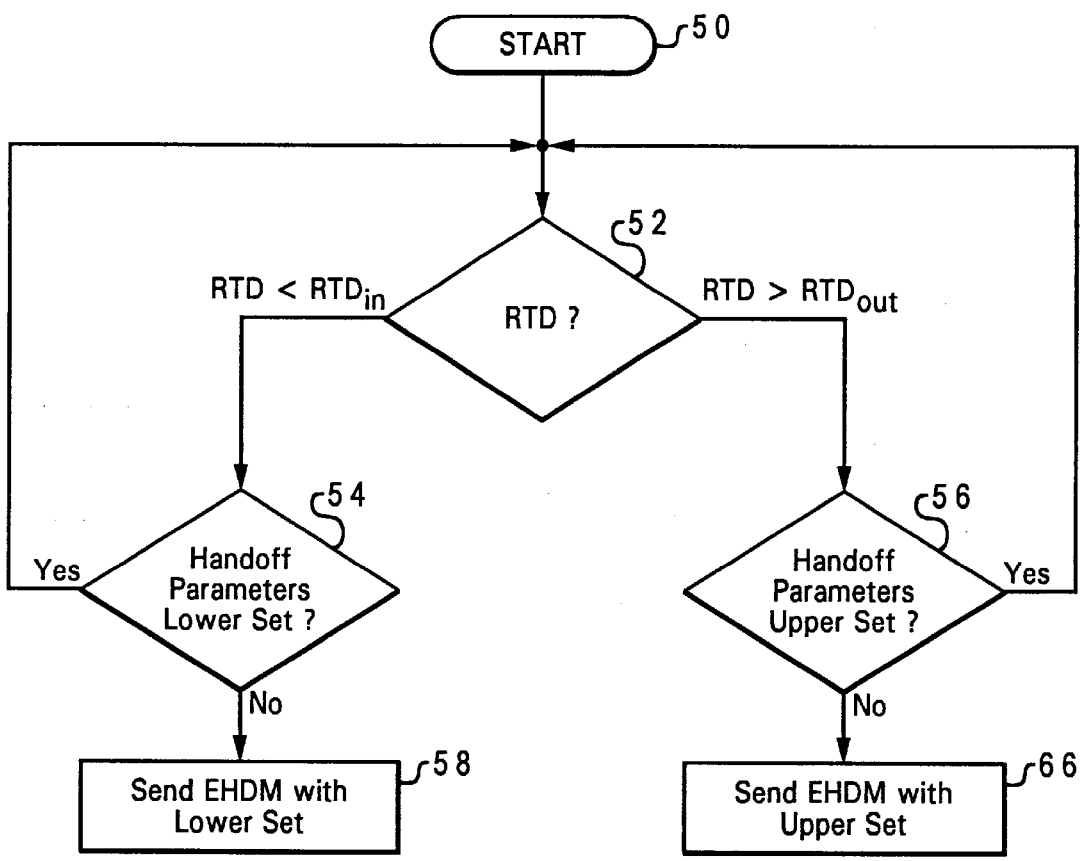
FIG. 7 depicts a high level flow diagram for sector handoff in accordance with the present invention.

Referring to FIG. 7, a high level flow chart in accordance with the present invention is depicted. The process starts at block 50 and proceeds to block 52. The mobile telephone continuously or selectively monitors the RTD. The value of RTD is compared to preselected parameters of RTD in and $RTD_{out}$. If $RTD<RTD_{in}$, the method queries the base station to determine if the lower set of handoff parameters are being utilized as in block 54. If the lower set are being utilized, the method returns to monitor RTD. If the lower set of parameters are not being utilized, an EHDM is sent by the base station to the mobile station with the lower set of handoff parameters in accordance with block 58. When the conditions are satisfied a soft handoff will occur pursuant to the lower set of parameters.

If a mobile radio telephone is initially powered up and attempts to initiate a call when it is in close vicinity to the antenna mast, the upper set of parameters may prevent initialization. It is preferred that on power up, a mobile radio telephone loads the lower set of parameters supplied by the network or the paging channel via the "system parameters message," referred to IS-95. After a communication link is established, the proper parameters will be loaded in accordance with the method of FIG. 7. Alternately, if during power up, initialization can not be achieved, the mobile can automatically load lower parameters and re-attempt initialization. Many embodiment could be utilized on power up and the method disclosed should not be utilized to limit the scope of the present invention.

Referring back to block 52, if $RTD>RTD_{out}$, the method determines if the upper set of handoff parameters are being utilized as in block 56. If the upper set of parameters are being utilized the method returns to again monitor RTD as in block 52. If the upper set of parameters are not being utilized, the base station sends an EHDM message containing the upper set of parameters in accordance with block 66. When communication conditions dictate, a soft handoff occurs pursuant to the upper set of parameters.

In a preferred embodiment, the lower set of handoff parameters is sent to the mobile radio telephone before it gets in close proximity to the antenna. This enables the mobile radio telephone to search for pilot C/I signals utilizing the lower level parameters and the mobile radio telephone can add marginal channels and avoid being dropped when the mobile radio telephone enters a high interference area with high network loading.

Once the mobile radio telephone moves out of the high interference area or $RTD_{in}$, the upper set of parameters are sent by the base station controller to the mobile radio telephone. Therefore, cell boundaries are not affected in cell to cell handoff procedures.

While the invention has been particularly shown and described with reference to a preferred embodiment, it will be understood by those skilled in the art that various changes in form and detail may be made therein without departing from the spirit and scope of the invention.

What is claimed is:

1. A method for improved sector handoff within a cell for utilization by a wireless communication systems, having multiple mobile radio telephones and a base antenna, said method comprising the steps of:

performing a sector handoff within said cell in accordance with a first set of parameters if a mobile radio telephone is a first distance from a base antenna of said cell; and performing said sector handoff in accordance with a second different set of parameters if said mobile radio telephone is a second distance from said base antenna, wherein said first distance is greater than said second distance such that said second different set of parameters avoids drops and adverse handoffs due to interference and low signal levels and provides improved sector handoff when said mobile radio telephone is in a vicinity of said base antenna such that improved sector handoff can be achieved.

2. The method as in claim 1, further comprising the step of computing said first distance and said second distance utilizing radio signal propagation delay between said mobile telephone unit and said base antenna.

3. The method as in claim 1, wherein said first set of parameters and said second different set of handoff parameters are further comprised of a drop channel threshold.

4. The method as in claim 1, wherein said first set of parameters and said second different set of handoff parameters are further comprised of an add channel threshold.

5. The method as in claim 1, further comprising the steps of:

determining a round trip delay of a signal propagating between said mobile radio telephone and said base antenna; and comparing said round trip delay to a predetermined round trip delay threshold, wherein said first distance area is identified when said round trip delay is greater than said threshold and said second distance area is identified when said round trip delay is less than said threshold.

6. The method as in claim 1, wherein said performing step includes the step of utilizing said second different set of handoff parameters in sector handoff decisions when said mobile radio telephone receives side lobe interference.

7. The method as in claim 1, wherein said performing step includes the step of utilizing said first set of handoff parameters in sector handoff decisions when said mobile radio telephone does not receive side lobe signals.

8. The method as in claim 1, further comprising the step of computing said first distance utilizing near field radiation.

9. A system for improving handoff service of a mobile communication device comprised of:

a base antenna;

means for executing a first set of handoff guidelines to a communication unit within a sector of a cell defined by said base antenna when said communication unit is in a first area away from said base antenna; and means for executing a second different set of handoff guidelines within said sector when said communication unit is in a second area in proximity to said base antenna closer than said first area.

10. The system as in claim 9, wherein said first set of guidelines are implemented in response to a delay of a radio signal propagation from said communication unit to said base antenna.

11. The system as in claim 9, wherein said first set of parameters and said second different set of handoff parameters are further comprised of a drop threshold.

12. The system as in claim 9, wherein said first set of parameters and said second different set of handoff parameters are further comprised of an add threshold.

13. The system as in claim 9, further comprising:

means for determining a round trip delay of a signal propagating from said communication unit to said base antenna; and means for comparing said round trip delay to a predetermined round trip delay threshold, wherein said first distance area is identified when said round trip delay is greater than said threshold and said second distance area is identified when said round trip delay is less than said threshold.

14. The system as in claim 9, wherein said second different set of handoff parameters are utilized in handoff decisions when said communication unit is receiving minor lobe signals.

15. The system as in claim 9, wherein said first set of handoff parameters are utilized in handoff decisions when said communication unit is not receiving side lobe signals.

16. The system as in claim 9, wherein an extended handoff direction message is established between said base antenna and said communication unit.

17. The system as in claim 9, wherein said first distance is determined by near field effects of said base antenna.

* * * * *